United States Patent
Lee et al.

(10) Patent No.: US 10,001,363 B2
(45) Date of Patent: Jun. 19, 2018

(54) COMMON-PATH OPTICAL FIBER-BASED HANDHELD PARALLEL OPTICAL COHERENCE TOMOGRAPHY (OCT) APPARATUS

(71) Applicant: Korea Basic Science Institute, Daejeon (KR)

(72) Inventors: Kye Sung Lee, Daejeon (KR); Gun Hee Kim, Sejong-si (KR); Hwan Hur, Daejeon (KR); I Jong Kim, Daejeon (KR); Ki Soo Chang, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 0 days. days.

(21) Appl. No.: 15/385,886

(22) Filed: Dec. 21, 2016

(65) Prior Publication Data

US 2018/0128594 A1    May 10, 2018

(30) Foreign Application Priority Data

Nov. 9, 2016 (KR) .................. 10-2016-0148708

(51) Int. Cl.
*G01B 9/02* (2006.01)

(52) U.S. Cl.
CPC ..... *G01B 9/02091* (2013.01); *G01B 9/02007* (2013.01); *G01B 9/02023* (2013.01); *G01B 9/02044* (2013.01); *G01B 9/02057* (2013.01); *G01B 2290/30* (2013.01)

(58) Field of Classification Search
CPC ............ G01B 9/02044; G01B 9/02049; G01B 9/0205; G01B 9/02054; G01B 9/02091
See application file for complete search history.

(56) References Cited

U.S. PATENT DOCUMENTS

2014/0160482 A1*  6/2014  Tearney ............. G01B 9/02044
                                                     356/451
2015/0055137 A1*  2/2015  Brown .............. G01B 9/02091
                                                     356/479

FOREIGN PATENT DOCUMENTS

KR    10-2014-0068346    6/2014
KR    10-2016-0128854    11/2016

OTHER PUBLICATIONS

Lee et al. "Spectrally Encoded Common-Path Fiber-Optic-Based Parallel Optical Coherence Tomography", Optics Letters, 41(18): 4241-4244, Published Online Sep. 9, 2016.

* cited by examiner

Primary Examiner — Jonathan Hansen

(57) ABSTRACT

Provided is a common-path optical fiber-based handheld parallel optical coherence tomography (OCT) apparatus, including a probe configured to receive the light from a broadband light source and illuminate a measurement target, wherein the probe may include an inner space through which the light passes, a collimator configured to collimate the light incident to the inner space, a diffraction grating configured to diffract the light having passed through the collimator, a galvanometer scanner configured to reflect the light having passed through the diffraction grating, an objective lens configured to concentrate the reflected light on a focal point, and an interferer configured to acquire an interfered light by reflecting at least a portion of the light having passed through the objective lens.

8 Claims, 8 Drawing Sheets

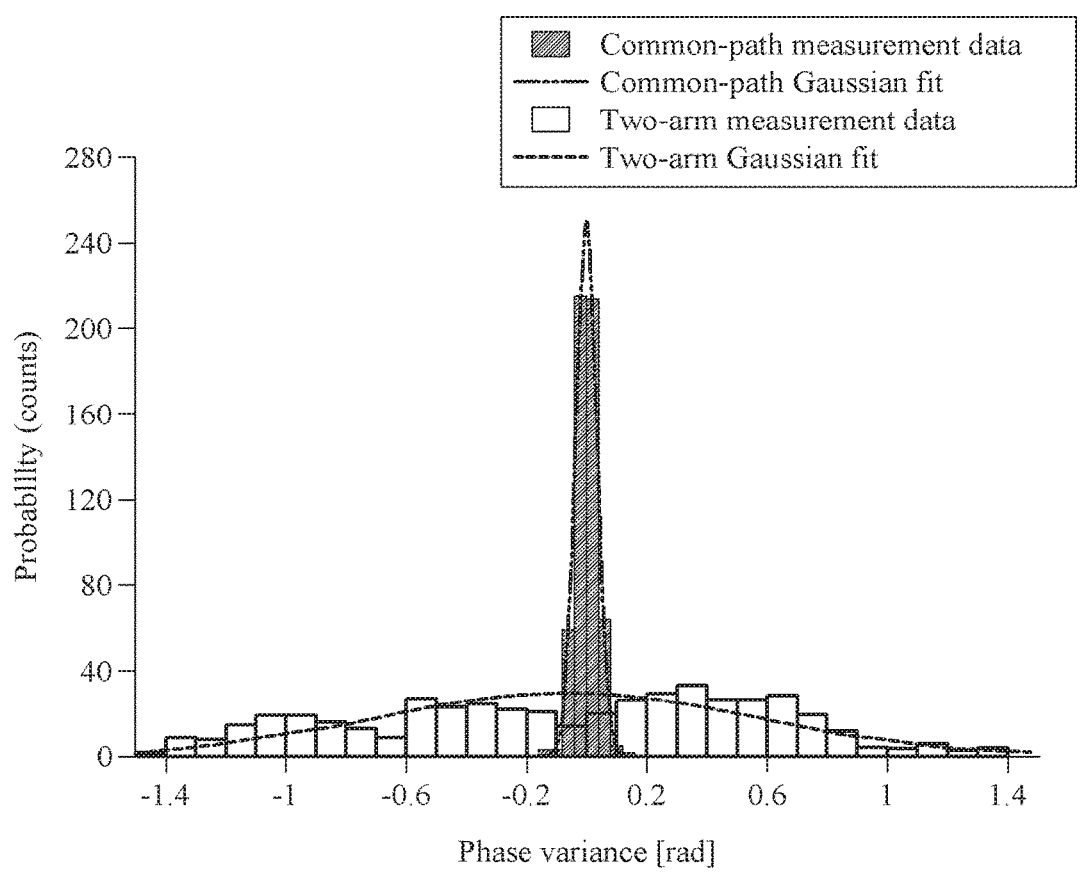

Case1: Common-path & shaking fiber

Case2: Two-arm & stationary fiber

COMMON-PATH OPTICAL FIBER-BASED HANDHELD PARALLEL OPTICAL COHERENCE TOMOGRAPHY (OCT) APPARATUS

RELATED APPLICATION

This application claims the benefit of priority of Korean Patent Application No. 10-2016-0148708 filed Nov. 9, 2016, the contents of which are incorporated herein by reference in their entirety.

FIELD AND BACKGROUND OF THE INVENTION

One or more example embodiments relate to a common-path optical fiber based handheld parallel optical coherence tomography (OCT) apparatus.

In a medical field, an optical coherence tomography (OCT) has been used to acquire a tomographic image of a measurement target. The OCT is technology for acquiring a high resolution tomographic image by radiating an infrared ray to the measurement target and analyzing a reaching time and an amount of light reflected from the measurement target based on a property of tissue using an optical interferometer. In contrast to ultrasonic waves, light may not deeply penetrate a living tissue due to scattering and absorption. Thus, the light may be applied through a fiber-optic endoscope to acquire an inner body image.

The OCT may be classified in the view of beam scanning type into a single point scanning and a parallel scanning for acquiring two-dimensional and three-dimensional information. Although research on the parallel type is actively conducted based on advantageous effects such as a quick acquirement of an image, the parallel type may be restrictively applicable to, for example, endoscope because parallel optical data is not transmittable to an optical fiber.

In related arts, a parallel OCT apparatus may include an inspection lens configured to radiate a near infrared ray to a measurement target and detect a light reflected from the measurement target, and a mirror configured to output a reference light used for a light interference. Also, the parallel OCT apparatus may adopt a two-arm type to perform the light interference on the reference light and the reflected light from the measurement target, both of which are transmitted through two stationary paths.

When an interferometer of the conventional parallel OCT apparatus is manufactured using an optical fiber, the inspection lens, the mirror, and optical fiber cables may be connected to one another to transfer the light. In this example, when a posture of at least one of the optical fiber cables is changed or when at least one of the optical fiber cables is wobbled, noise may occur due to a change in phase difference of the reference light and the reflected light in a process of performing the light interference. For this reason, in a process of capturing an image, the inspection lens and the mirror may need to be fixed without using an optical fiber cable.

SUMMARY OF THE INVENTION

An aspect provides a common-path optical fiber-based handheld parallel optical coherence tomography (OCT) apparatus in a handheld type using an optical fiber to acquire a stable and accurate tomographic image. Also, in the present disclosure, a small-sized probe is applicable to an endoscope probe.

According to an aspect, there is provided a common-path optical fiber-based handheld parallel optical coherence tomography (OCT) apparatus including a broadband light source configured to emit a light including a near infrared ray, a probe configured to receive the light from the broadband light source and illuminate a measurement target, and formed to be gripped with a hand, a spectrometer configured to receive the light output from the probe and analyze a wavelength of the light, an operation processor configured to generate a tomographic image of the measurement target through a Fourier transformation of the wavelength analyzed by the spectrometer, an optical fiber circulator configured to adjust a path of the light moving among the broadband light source, the probe, and the spectrometer, a first optical fiber cable configured to connect the broadband light source and the optical fiber circulator, and formed of a flexible material, a second optical fiber cable configured to connect the probe and the optical fiber circulator, and formed of a flexible material, and a third optical fiber cable configured to connect the spectrometer and the optical fiber cable, and formed of a flexible material.

The probe may include an inner space through which the light transferred from the third optical fiber cable passes, a collimator configured to collimate the light incident to the inner space, a diffraction grating configured to diffract the light having passed through the collimator, a relay lens configured to extend an image of the light having passed through the diffraction grating, a galvanometer scanner configured to reflect the light having passed through the relay lens, an objective lens configured to concentrate the reflected light on a focal point, and an interferer configured to acquire an interfered light by reflecting at least a portion of the light having passed through the objective lens.

When a direction facing the measurement target is forward, the interferer may include a first glass disposed forward the objective lens, a second glass disposed forward the first glass, and a cover glass disposed forward the second glass.

A front face of the second glass may include a beam splitter layer, and the light reflected from the measurement target may be interfered with by a light reflected from the beam splitter layer, sequentially pass through the third optical fiber cable, the optical fiber circulator, and the second optical fiber cable, and be input to the spectrometer.

A front face and a rear face of the cover glass, and a rear face of the first glass, and a rear face of the second glass may include an anti-reflective coated layer, and the front face of the first glass may not include a coated layer to reflect a portion of a light.

The first glass, the second glass, and the cover glass may include an optical glass or an optical polymer.

The focal point of the objective lens may be formed forward the cover glass, and a distance between the beam splitter layer and the focal point of the objective lens may be the same as a distance between the beam splitter layer and the front face of the first glass.

The probe may have a curved shape based on the galvanometer scanner.

Additional aspects of example embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the invention will become apparent and more readily appreciated from the following description of example embodiments, taken in conjunction with the accompanying drawings of which:

FIG. 5 is a graph illustrating a distribution of a difference in phase of lights measured through light phase transitions in an optical fiber-based two-arm parallel OCT apparatus and a common-path optical fiber-based handheld parallel OCT apparatus according to an example embodiment;

DESCRIPTION OF SPECIFIC EMBODIMENTS OF THE INVENTION

Figure 1:
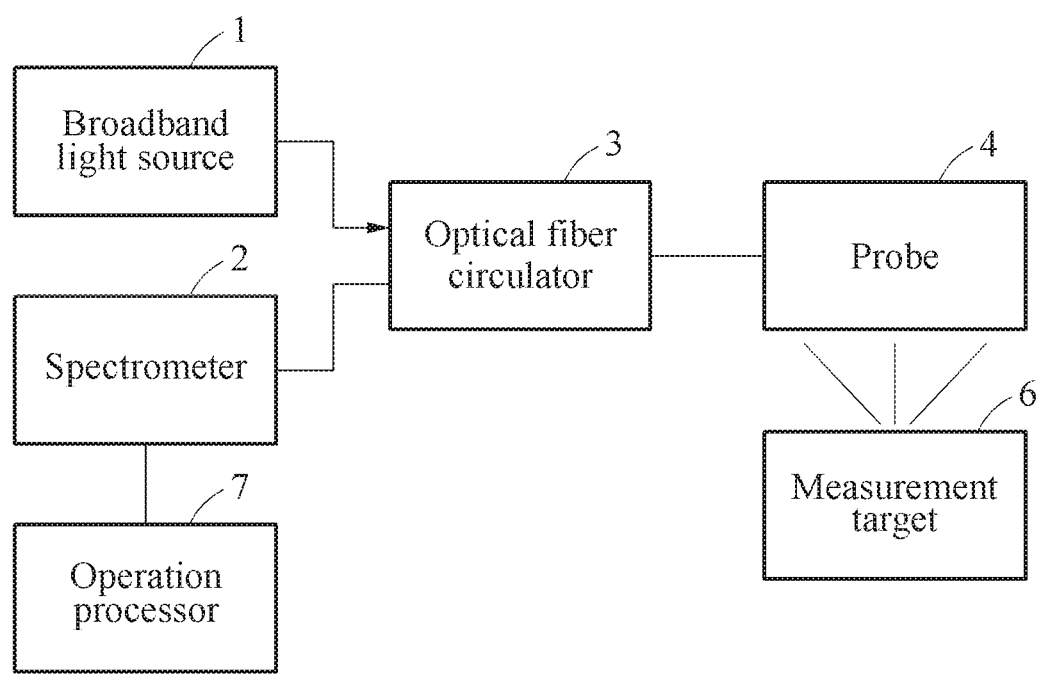
FIG. 1 is a block diagram illustrating a common-path optical fiber-based handheld parallel (OCT) apparatus according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a block diagram illustrating a common-path optical fiber-based handheld parallel optical coherence tomography (OCT) apparatus according to an example embodiment.

Referring to FIG. 1, a common-path optical fiber-based handheld parallel OCT apparatus 10 may perform a spectrally encoded OCT and a parallel OCT to capture an image of a measurement target 6. Here, the measurement target 6 may be, for example, a human body. The common-path optical fiber-based handheld parallel OCT apparatus 10 may be provided in a handheld form. A user, for example, a physician may hold a probe 4 in a hand and capture a tomographic image of a target part of a body. The common-path optical fiber-based handheld parallel OCT apparatus 10 may include a broadband light source 1, a spectrometer 2, an optical fiber circulator 3, the probe 4, and an operation processor 7.

The broadband light source 1 may be a light source that outputs a light having a wide spectral radiation spectrum including a near-infrared region and may output a low-coherence light. For example, a super luminescent diode, a titanium-sapphire (Ti-Sapphire) laser, or a femtosecond laser may be used as the broadband light source 1. A light output from the broadband light source 1 may be transferred to the probe 4 through the optical fiber circulator 3.

The probe 4 may receive the light output from the broadband light source 1, illuminate the measurement target 6, make the light reflected from the measurement target 6 into an interfered light using a Mirau interferometer scheme, and transfer the interfered light to the spectrometer 2 through the optical fiber circulator 3. The probe 4 will be described with reference to FIG. 2.

The spectrometer 2 may receive the interfered light output through a capturing of the measurement target 6 using the probe 4, detect a spectrum of the interfered light, acquire an interfered spectrum image through a spectrum analysis, and transmit the interfered spectrum image to the operation processor 7. For example, the spectrometer 2 may include a complementary metal-oxide-semiconductor (CMOS) camera to change the received interfered light into digital information for each pixel and acquire an image of each pixel.

The operation processor 7 may measure depth information of the measurement target 6 by performing a Fourier Transformation on each pixel of the received interfered spectrum image and generate the tomographic image of the measurement target 6.

The optical fiber circulator 3 may be associated with an input and an output of a plurality of optical fiber cables, and divide the received light or determine a direction and a proportion of a light to be output. The optical fiber circulator 3 may be connected to each of the broadband light source 1, the spectrometer 2, and the probe 4. Through this, the optical fiber circulator 3 may transfer the light from the broadband light source 1 to the probe 4, and transfer the interfered light from the probe 4 to the spectrometer 2.

The optical fiber circulator 3 may include a first optical fiber cable 5a connected to the broadband light source 1, a second optical fiber 5b connected to the spectrometer 2, and a third optical fiber cable 5c connected to the probe 4. The first optical fiber cable 5a, the second optical fiber 5b, and the third optical fiber cable 5c will be described with reference to FIG. 2.

Figure 2:
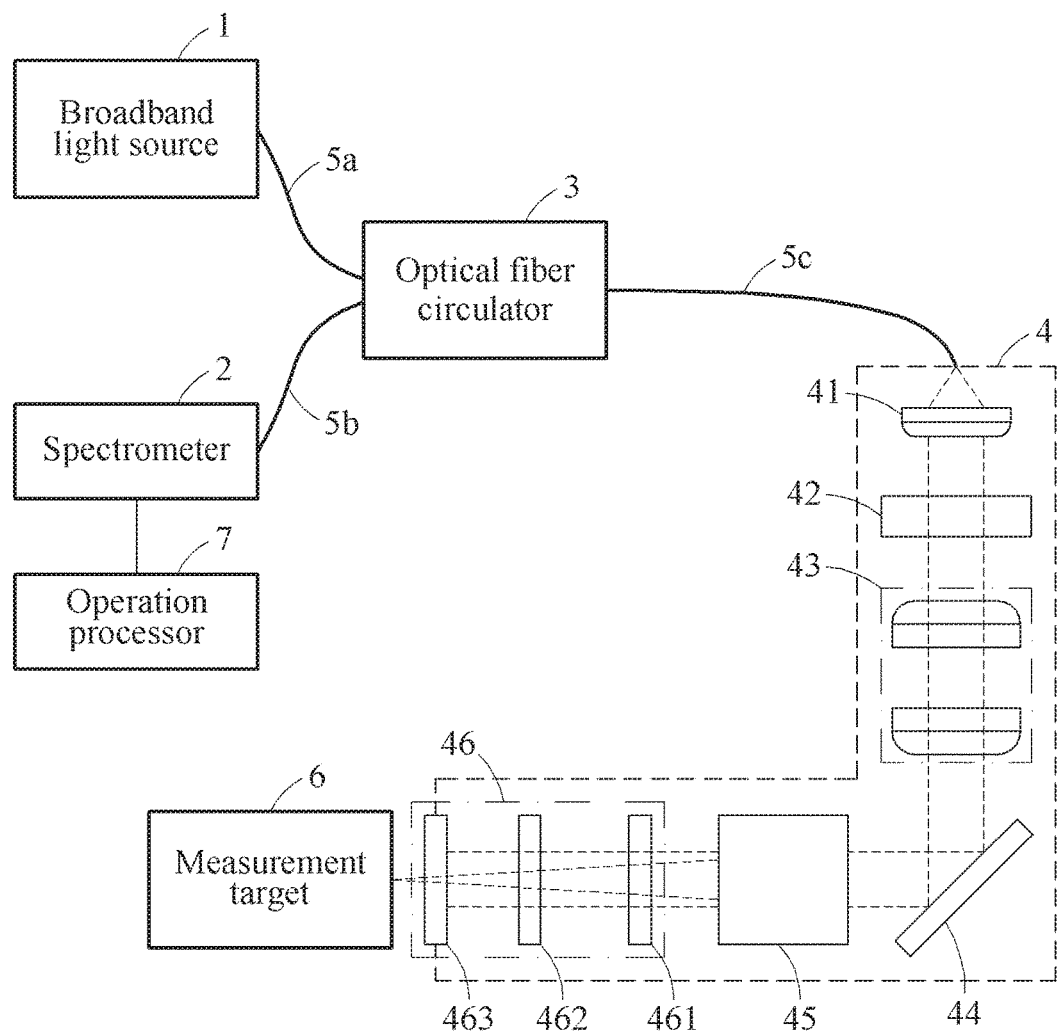
FIG. 2 is a diagram illustrating a configuration of a common-path optical fiber-based handheld parallel OCT apparatus according to an example embodiment.

FIG. 2 is a diagram illustrating a configuration of a common-path optical fiber-based handheld parallel OCT apparatus according to an example embodiment.

Referring to FIG. 2, the common-path optical fiber-based handheld parallel OCT apparatus 10 may include the first optical fiber cable 5a, the second optical fiber 5b, and the third optical fiber cable 5c.

The first optical fiber cable 5a may connect the broadband light source 1 and the optical fiber circulator 3, and function as a path through which a light emitted from the broadband light source 1 passes. The first optical fiber cable 5a may be formed of a flexible material that allows the first optical fiber cable 5a to be bent.

The second optical fiber cable 5b may connect the spectrometer 2 and the optical fiber circulator 3, and function as a path through which an interfered light is transmitted from the probe 4 to the spectrometer 2 through the optical fiber circulator 3. The second optical fiber cable 5b may be formed of a flexible material that allows the second optical fiber cable 5b to be bent.

The third optical fiber cable 5c may connect the probe 4 and the optical fiber circulator 3. The third optical fiber cable 5c may function as a path through which the light is transmitted from the broadband light source 1 to the probe 4 through the optical fiber circulator 3, and simultaneously function as a path through which the interfered light is transmitted from the probe 4 to the optical fiber circulator 3. The third optical fiber cable 5c may be formed of a flexible material that allows the third optical cable 5c to be bent.

Referring to FIG. 2, the probe 4 may include an inner space through which a light passes. The inner space may include a collimator 41, a diffraction grating 42, a relay lens 43, a galvanometer scanner 44, an objective lens 45, and an interferer 46.

The probe 4 may be formed to have a size, a shape, and a weight such that a user grips the probe 4 with a hand. The inner space of the probe 4 may be in a shape curved based on the galvanometer scanner 44 included in the inner space. An external shape of the probe 4 may be curved similarly to the curved shape of the inner space.

The collimator 41 may be at a foremost position on a path of the light that is output from the third optical fiber cable 5c connected to the probe 4. The collimator 41 may convert the light incident from the third optical fiber cable 5c into a parallel light and transfer the parallel light to the diffraction grating 42.

The diffraction grating 42 may be located next to the collimator 41 relative to a direction in which the light is output from the third optical fiber cable 5c. The diffraction grating 42 may diffract and diffuse the light incident from the collimator 41, and the light may be transferred from the diffraction grating 42 to the relay lens 43.

The relay lens 43 may be located next to the diffraction grating 42 relative to the direction in which the light is output from the third optical fiber cable 5c. The relay lens 43 may include a plurality of lenses and configured to extend an image of the incident light. Also, the relay lens 43 may transfer the light received from the diffraction grating 42 to the galvanometer scanner 44.

The galvanometer scanner 44 may be located next to the relay lens 43 relative to the direction in which the light is output from the third optical fiber cable 5c. The galvanometer scanner 44 may continually reflect the light incident from the relay lens 43 at various angles. For example, the galvanometer scanner 44 may include a galvanometer and a mirror connected to the galvanometer.

The objective lens 45 may be located next to the galvanometer scanner 44 relative to the direction in which the light is output from the third optical fiber cable 5c. The objective lens 45 may collect the light reflected from the galvanometer scanner 44 on a focal point of the objective lens 45.

The interferer 46 may be located next to the objective lens 45 relative to the direction in which the light is output from the third optical fiber cable 5c. The interferer 46 may radiate the light that is output from the objective lens 45 to the measurement target 6 and interfere in the light reflected from the measurement target 6 using a Mirau interferometer scheme, thereby acquiring an interfered light. The interferer 46 may output the interfered light in a reversed direction of the direction in which the light is output from the third optical fiber cable 5c.

The interfered light generated in the interferer 46 may pass the objective lens 45, the galvanometer scanner 44, the relay lens 43, the diffraction grating 42, and the collimator 41 in sequence. Through this, the interfered light may be transferred from the third optical fiber cable 5c through the optical fiber circulator 3 and the second optical fiber 5b to the spectrometer 2.

The interferer 46 will be described in detail with reference to FIG. 3.

Figure 3:
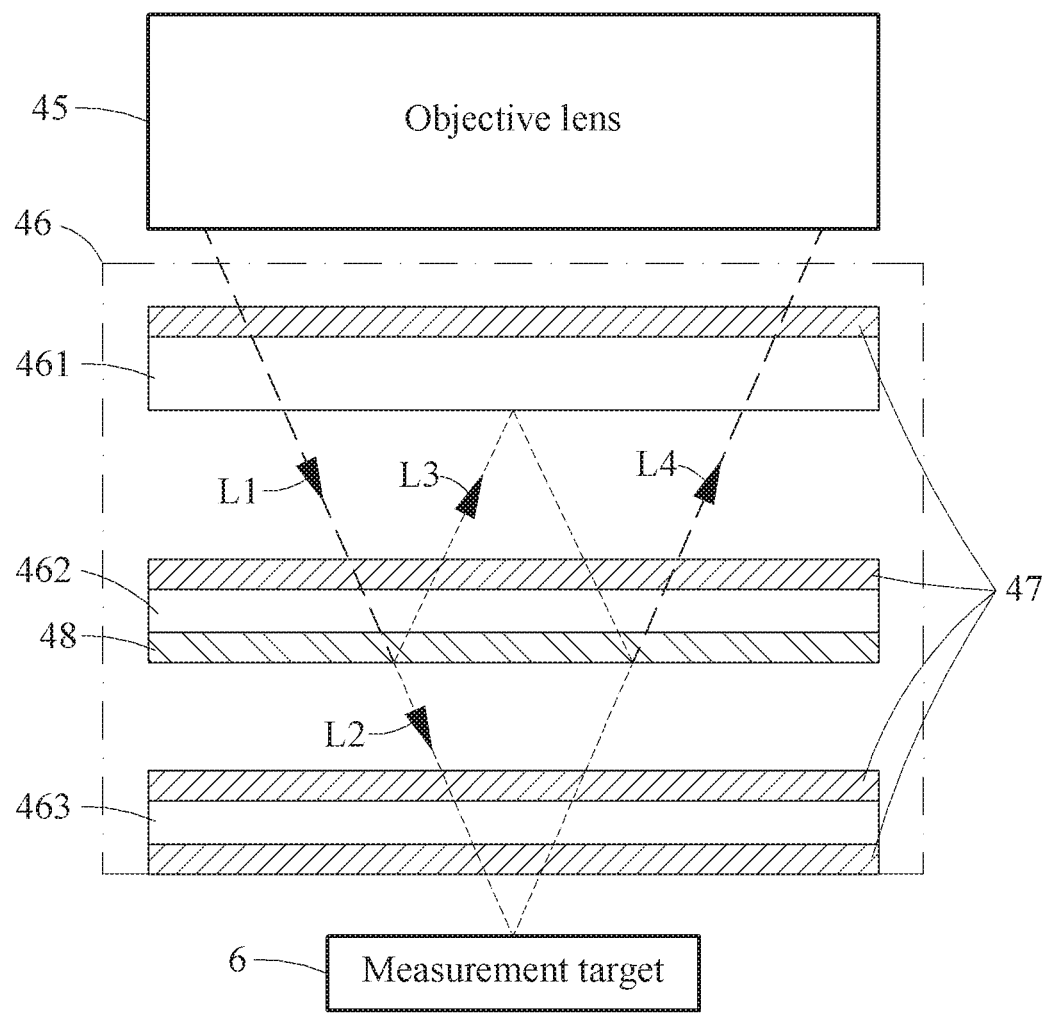
FIG. 3 is a block diagram illustrating a portion of a common-path optical fiber-based handheld parallel OCT apparatus according to an example embodiment.

FIG. 3 is a block diagram illustrating a portion of a common-path optical fiber-based handheld parallel OCT apparatus according to an example embodiment.

Referring to FIG. 3, the interferer 46 may include a first glass 461, a second glass 462, and a cover glass 463.

When a direction in which the measurement target 6 is located is forward, the first glass 461 may be located forward the objective lens 45, the second glass 462 may be located forward the first glass 461, and the cover glass 463 may be located forward the second glass 462.

The first glass 461, the second glass 462, and the cover glass 463 may include a flat optical crown glass, for example, BK7 glass that is a type of a borosilicate crown glass with Abbe numbers at least 55 which is an optical constant associated with light dispersion.

Also, the first glass 461, the second glass 462, and the cover glass 463 may include a flat optical polymer. The first glass 461 may be located forward the objective lens 45. A rear face of the first glass 461 may include the anti-reflective coated layer 47 and a front face of the first glass 461 may not be coated. In other words, the front face of the first glass 461 may not include a coated layer.

Since the first glass 461 includes an optical glass or an optical polymer, a portion of light incident to a non-coated layer of the first glass 461 may pass through the non-coated layer and the other portion of the light may be reflected. For example, 10% of the incident light may be reflected and a remaining portion of the incident light may pass.

The second glass 462 may be disposed forward the first glass 461. A rear face of the second glass 462 may include an anti-reflective coated layer 47, and a front face of the second glass 462 may include a beam splitter layer 48. A portion of light incident to the beam splitter layer 48 may pass through the beam splitter layer 48 and the other portion of the incident light may be reflected. For example, 80% of the incident light may pass through the beam splitter layer 48 and 20% of the incident light may be reflected.

The cover glass 463 may be located forward the second glass 462. A front face and a rear face of the cover glass 463 may include the anti-reflective coated layer 47. For example, the cover glass 463 may be located rearward the focal point of the objective lens 45.

Based on the foregoing structure, as shown in FIG. 3, the light incident into the interferer 46 may be changed to the interfered light through paths L1, L2, L3, and L4 and the interfered light may be output in a reversed direction.

For example, the light incident into the probe 4 may be incident to the interferer 46 through the objective lens 45. In this example, the light having passed the objective lens 45 may pass the first glass 461. Because the rear face of the first glass 461 includes the anti-reflective coated layer 47, the light may pass through the first glass 461 along the path L1 and be incident to the second glass 462.

Since the rear face of the second glass 462 also include the anti-reflective coated layer 47, the light may be transmitted to the beam splitter layer 48 formed on the front face of the second glass 462 along the path L1.

When the light reaches the beam splitter layer 48, a portion of the light may pass through the beam splitter layer 48 and travel along the path L2, and the other portion of the light may be reflected from the beam splitter layer 48 and travel along the path L3.

The light having passed the beam splitter layer 48 may move along the path L2 extended from the path L1 and pass through the cover glass 463. Since both front face and rear face of the cover glass 463 include the anti-reflective coated layer 47, the light may pass the cover glass 463 and be incident to the measurement target 6 external to the interferer 46.

A portion of the light incident to the measurement target 6 may be absorbed into the measurement target 6. The other portion of the incident light may be reflected at an angle the same as an angle at which the light is incident to the measurement target 6 and incident to the interferer 46 again. The other portion of the light reflected from the measurement target 6 may be incident to the front face of the second glass 462, that is, the beam splitter layer 48 by passing through the cover glass 463.

The light that is reflected from the beam splitter layer 48 to travel along the path L3 while moving along the path L1 may be reflected at an angle the same as an angle at which the light is incident to the beam splitter layer 48. The reflected light may travel toward the first glass 461 and reach a center of the first glass 461. In this instance, since the front face of the first glass 461 does not include a coated layer, at least a portion of the light may be reflected from the front face of the first glass 461.

The light reflected from the front face of the first glass 461 may be reflected at the same angle and then, travel toward the second glass 462 again. The reflected light may pass through the rear face of the second glass 462 and travel toward the beam splitter layer 48 of the second glass 462. When the light reaches the beam splitter layer 48 again, a portion of the light may be reflected to travel along the path L4.

Through the foregoing process, the light having traveled along the path L2 and reflected from the measurement target 6 and the light having traveled along the path L3 and reflected from the center of the front face of the first glass 461 may meet on the beam splitter layer 48, and then may be partially combined with each other. Through this, an interfered light may be generated. The interfered light may travel along the path L4 and pass through the first glass 461 so as to be incident to the objective lens 45 again.

As such, the light incident to the probe 4 may illuminate the measurement target 6. In this instance, the light reflected from the measurement target 6 and the light reflected from the front face of the first glass 461 may be combined into the interfered light. The interfered light may reversely move in a reversed direction of the path through which the light is incident from the third optical fiber cable 5c to the probe 4 so as to be output to the third optical fiber cable 5c.

Figure 4:
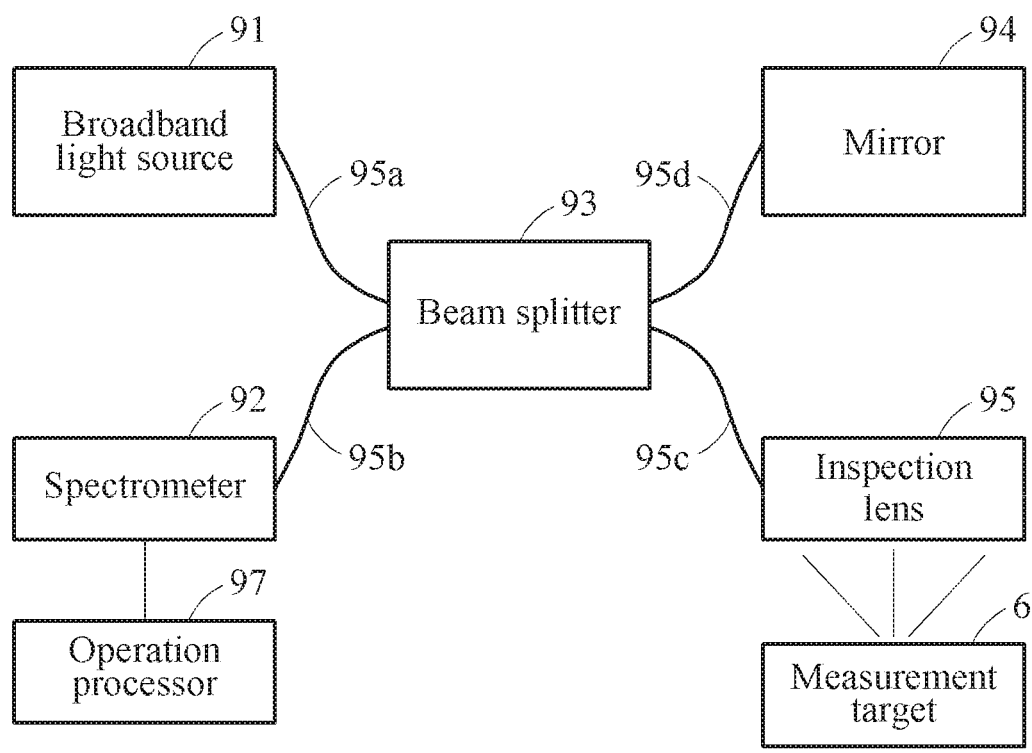
FIG. 4 is a diagram illustrating a configuration of an optical fiber-based two-arm parallel OCT apparatus according to an example embodiment.

FIG. 4 is a diagram illustrating a configuration of an optical fiber-based two-arm parallel OCT apparatus according to an example embodiment.

Referring to FIG. 4, an optical fiber-based two-arm parallel OCT apparatus 90 may include a broadband light source 91, a spectrometer 92, a beam splitter 93, a mirror 94, an inspection lens 95, a first optical fiber cable 95a, a second optical fiber cable 95b, a third optical fiber cable 95c, a fourth optical fiber cable 95d, and an operation processor 97.

The broadband light source 91, the spectrometer 92, the operation processor 97, the first optical fiber cable 95a, and the second optical fiber cable 95b may respectively perform an operation similarly to the broadband light source 1, the spectrometer 2, the operation processor 7, the first optical fiber cable 5a, and the second optical fiber cable 5b in the common-path optical fiber-based handheld parallel OCT apparatus 10 of FIG. 2.

The beam splitter 93 may divide the light output from the broadband light source 91 to output to the mirror 94 and the inspection lens 95. Also, the beam splitter 93 may receive a light from the inspection lens 95 and the mirror 94 and transfer the light to the spectrometer 92.

The beam splitter 93 may include the first optical fiber cable 95a connected to the broadband light source 91, the second optical fiber cable 95b connected to the spectrometer 92, the third optical fiber cable 95c connected to the inspection lens 95, and the fourth optical fiber cable 95d connected to the mirror 94.

The third optical fiber cable 95c may connect the beam splitter 93 and the inspection lens 95. The third optical fiber cable 95c may transfer the light from the broadband light source 91 to the inspection lens 95 and, simultaneously, transfer the light from the inspection lens 95 to the beam splitter 93.

The fourth optical fiber cable 95d may connect the beam splitter 93 and the mirror 94. The fourth optical fiber cable 95d may transfer the light from the broadband light source 91 to the mirror 94 and, simultaneously, transfer the light from the mirror 94 to the beam splitter 93.

The inspection lens 95 may radiate the light received from the broadband light source 91 to a measurement target and transfer the light reflected from the measurement target to the beam splitter 93. For example, the inspection lens 95 may be understood as a configuration corresponding to the probe 4 included in the common-path optical fiber-based handheld parallel OCT apparatus 10 of FIG. 2, the probe from which the interferer 46 is removed.

The mirror 94 may acquire a reference light to interfere in the light radiated from the inspection lens 95 to the measurement target and reflected from the measurement target. The mirror 94 may include, for example, a dispersion compensator.

The dispersion compensator may compensate for a difference in length between the third optical fiber cable 95c and the fourth optical fiber cable 95d, and a difference in phase based on a difference in optical condition between the mirror 94 and the inspection lens 95.

Based on the foregoing structure, the inspection lens 95 of the optical fiber-based two-arm parallel OCT apparatus 90 may illuminate the measurement target 6 and output the light reflected from the measurement target 6 to the beam splitter 93. Simultaneously, the mirror 94 may output the light reflected from the mirror 94 to the beam splitter 93.

The light output by the inspection lens 95 may pass through the third optical fiber cable 95c and the light output by the mirror 94 may pass through the fourth optical fiber cable 95d. The light output by the inspection lens 95 and the light output by the mirror 94 may be combined with each other at the beam splitter 93 so as to be formed into an interfered light. The interfered light may pass through the second optical fiber cable 95b and be transferred to the spectrometer 92 and the operation processor 97, and used to acquire a tomographic image of the measurement target 6.

The optical fiber-based two-arm parallel OCT apparatus 90 may include the mirror 94 and the inspection lens 95 to perform a light interference. Also, the inspection lens 95 optical fiber-based two-arm parallel OCT apparatus 90 may be provided in a two-arm type to transfer the light from the mirror 94 to two optical fiber cables, that is, the third optical fiber cable 95c and the fourth optical fiber cable 95d.

The common-path optical fiber-based handheld parallel OCT apparatus 10 may be provided in a common-path type and thus, a capturing and a light interference may be performed in the probe 4 and an interfered light may be transferred to one optical fiber cable, for example, the third optical fiber cable 95c. In this example, the common-path optical fiber-based handheld parallel OCT apparatus 10 may not use a configuration corresponding to the mirror 94 and thus, may be realized in a simple structure. Also, using the common-path optical fiber-based handheld parallel OCT apparatus 10, a phase of the light may not be changed despite the first optical fiber cable 5a, the second optical fiber cable 5b, and third optical fiber cable 5c being wobbled or vibrated, which may prevent degradation in a quality of an image. Such characteristics will be described in detail with reference to FIGS. 5, 6A, 6B, and 6C.

FIG. 5 is a graph illustrating a distribution of a difference in phase between a light reflected from the measurement target 6 and a reference light measured through 569 stages of phase transitions in each of the common-path optical fiber-based handheld parallel OCT apparatus 10 and the optical fiber-based two-arm parallel OCT apparatus 90 according to an example embodiment.

Referring to FIG. 5, a distribution of a difference in phase of the common-path optical fiber-based handheld parallel OCT apparatus 10 is concentrated in a range between −0.2 [rad] and 0.2 [rad], and converged to 0 [rad].

A difference in phase of the optical fiber-based two-arm parallel OCT apparatus 90 is widely distributed in a range between −1.4 [rad] and 1.4 [rad].

As shown in the graph of FIG. 5, in comparison to the optical fiber-based two-arm parallel OCT apparatus 90, the common-path optical fiber-based handheld parallel OCT apparatus 10 may have a smaller difference in phase obtained through the phase transition between the light reflected from the measurement target 6 and the reference light. Accordingly, the common-path optical fiber-based handheld parallel OCT apparatus 10 may acquire a stable and accurate tomographic image by performing an OCT when compared to the optical fiber-based two-arm parallel OCT apparatus 90.

Figure 6A:
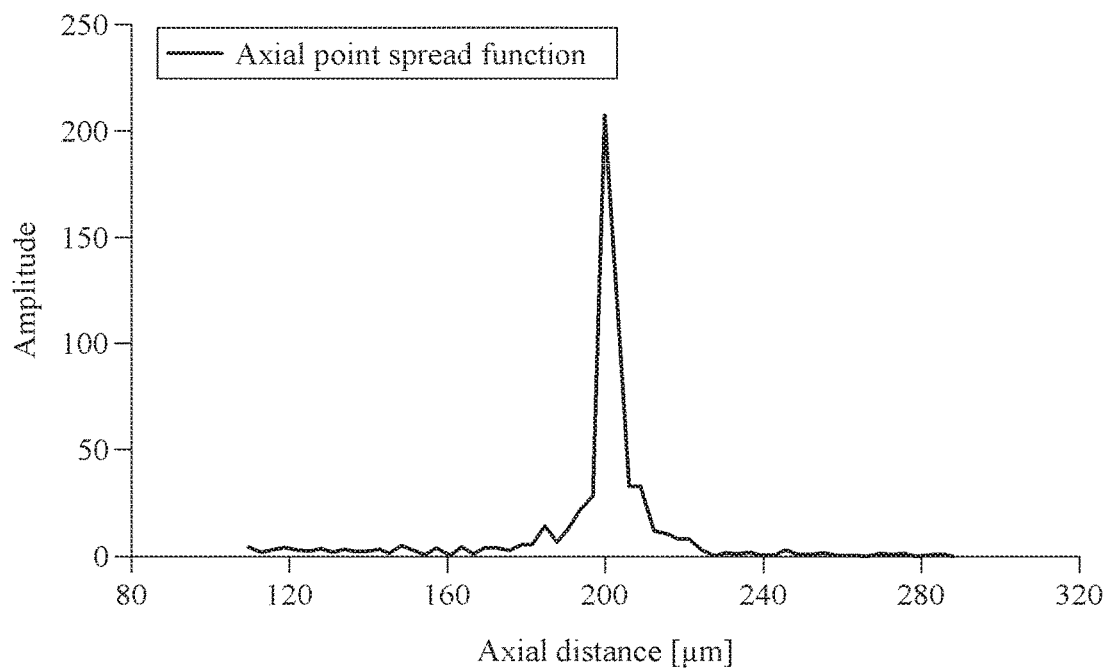
FIG. 6A is a graph illustrating a distribution function based on a depth of a tomographic image of a stationary mirror output when an optical fiber cable is wobbled in a process of capturing the stationary mirror using a common-path optical fiber-based handheld parallel OCT apparatus according to an example embodiment.

FIG. 6A is a graph illustrating a distribution function based on a depth of a tomographic image of a stationary mirror output when an optical fiber cable is wobbled in a process of capturing the stationary mirror using the common-path optical fiber-based handheld parallel OCT apparatus 10.

Referring to FIG. 6A, although an optical fiber cable is wobbled in a process of capturing, little noise may occur based on a depth of a tomographic image and thus, a graph of the common-path optical fiber-based handheld parallel OCT apparatus 10 may be approximately vertically symmetric based on a point corresponding to a depth of 200 micrometers (μm).

Figure 6B:
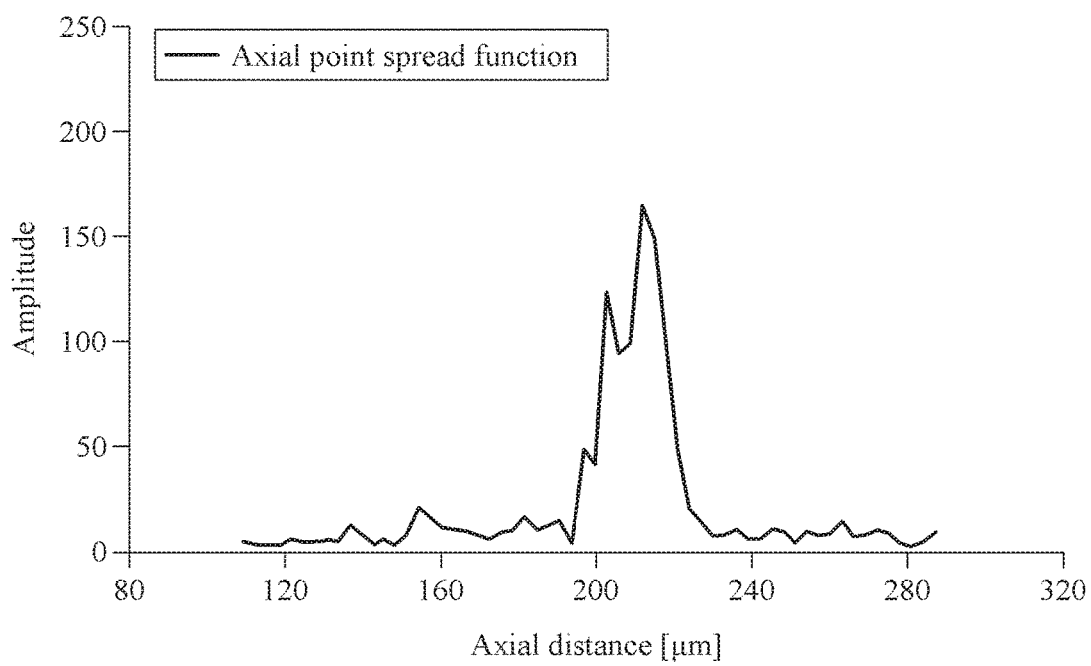
FIG. 6B is a graph illustrating a distribution function based on a depth of a tomographic image of a stationary mirror output when the stationary mirror is captured using an optical fiber-based two-arm parallel OCT apparatus according to an example embodiment.

FIG. 6B is a graph illustrating a distribution function based on a depth of a tomographic image of a stationary mirror output when the stationary mirror is captured using the optical fiber-based two-arm parallel OCT apparatus 90.

Referring to FIG. 6B, although an optical cable does not move in a process of capturing, noise may partially occur based on a depth in a tomographic image of a mirror. In comparison to an example of FIG. 6A, a graph of the optical fiber-based two-arm parallel OCT apparatus 90 may be vertically asymmetric and noise partially occurs in overall intervals.

Figure 6C:
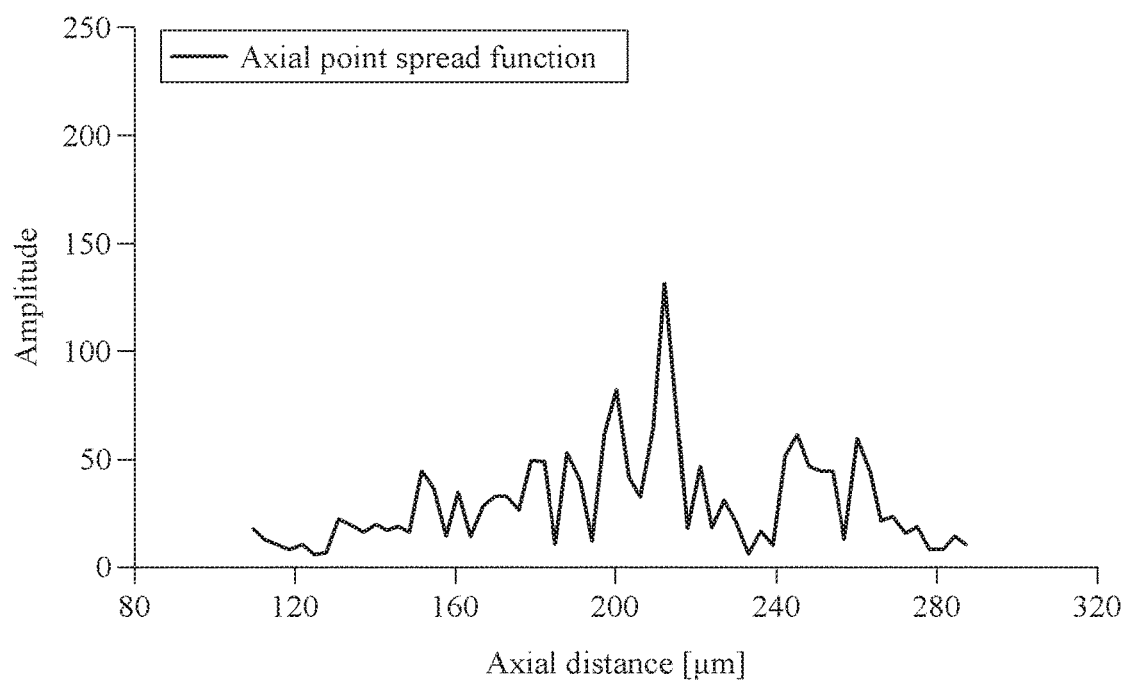
FIG. 6C is a graph illustrating a distribution function based on a depth of a tomographic image of a stationary mirror output when an optical cable is wobbled in a process of capturing the stationary mirror using an optical fiber-based two-arm parallel OCT apparatus according to an example embodiment.

FIG. 6C is a graph illustrating a distribution function based on a depth of a tomographic image of a stationary mirror output when an optical cable is wobbled in a process of capturing the stationary mirror using the optical fiber-based two-arm type parallel OCT apparatus 90.

Referring to FIG. 6C, when an optical cable is wobbled in a process of capturing, a lot of noise may occur based on a depth of a tomographic image. In comparison to an example of FIG. 6A, a lot of noise occurs in overall intervals of a graph of the optical fiber-based two-arm parallel OCT apparatus 90 and thus, the graph may be irregularly formed.

It can be known from the graphs of FIGS. 6A, 6B, and 6C that the difference in phase between the light reflected from the measurement target 6 and the reference light continually occurs in response to movements of the third optical fiber cable 95c and the fourth optical fiber cable 95d because the optical fiber-based two-arm parallel OCT apparatus 90 transfers the reflected light and the reference light through the third optical fiber cable 95c and the fourth optical fiber cable 95d. Due to the continually occurring difference, noise in a tomographic image may increase, which may lead to a decrease in a visibility of the tomographic image.

In contrast, a tomographic image captured using the common-path optical fiber-based handheld parallel OCT apparatus 10 and the first optical fiber cable 5a, the second optical fiber cable 5b, and the third optical fiber cable 5c which are in a wobbling state may have less noise and a higher visibility in comparison to a tomographic image captured using the optical fiber-based two-arm parallel OCT apparatus 90 and the first optical fiber cable 95a, the second optical fiber cable 95b, the third optical fiber cable 95c, and the optical fiber cable 95d which are in a stationary state.

Also, in a case of the common-path optical fiber-based handheld parallel OCT apparatus 10, influences exerted on the reflected light and the reference light from the wobbling of the first optical fiber cable 5a, the second optical fiber cable 5b, and the third optical fiber cable 5c may be offset each other. Thus, a user may capture a relatively high quality of tomographic image by moving the probe 4 while holding the probe 4 in a hand. In a medical situation, the user may freely grip the probe 4 and capture the measurement target 6 without restrictions on a posture of an optical fiber cable, an angle of the probe 4, and a location of the probe 4, thereby performing a parallel OCT. Also, a small-sized probe may be applicable to an endoscope probe configured to be inserted into a body.

According to an aspect, it is possible to provide a common-path optical fiber-based handheld parallel OCT apparatus configured to perform a light interference through a probe performing an inspection. In contrast to an optical fiber-based two-arm parallel OCT apparatus, the common-path optical fiber-based handheld parallel OCT apparatus may not require a reference mirror and an optical cable connected thereto. Thus, a configuration of the common-path optical fiber-based handheld parallel OCT may be simplified.

According to another aspect, it is possible to provide a common-path optical fiber-based handheld parallel OCT apparatus in a handheld type and an optical cable connected to the common-path optical fiber-based handheld parallel OCT apparatus and formed of a flexible material such that a user captures an image while holding the common-path optical fiber-based handheld parallel OCT apparatus in a hand.

According to still another aspect, it is possible to provide a common-path optical fiber-based handheld parallel OCT apparatus allowing light to be transmitted through a single optical cable path corresponding to a common path after a light interference is completed and thus, a quality of a tomographic image may not be affected although an optical fiber cable is wobbled or vibrated.

According to yet another aspect, it is possible to perform a parallel OCT by capturing a measurement target while freely holding a probe in a hand irrespective of a movement of an optical fiber cable and apply a small-sized probe to an endoscope probe inserted into a body.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A common-path optical fiber-based handheld parallel optical coherence tomography (OCT) apparatus including:
   a broadband light source configured to emit a light including a near infrared ray;
   a probe configured to receive the light from the broadband light source and illuminate a measurement target, and formed to be gripped with a hand;
   a spectrometer configured to receive the light output from the probe and analyze a wavelength of the light;
   an operation processor configured to generate a tomographic image of the measurement target through a Fourier transformation of the wavelength analyzed by the spectrometer;
   an optical fiber circulator configured to adjust a proportion and a path of the light moving among the broadband light source, the probe, and the spectrometer;
   a first optical fiber cable configured to connect the broadband light source and the optical fiber circulator, and formed of a flexible material;
   a second optical fiber cable configured to connect the probe and the optical fiber circulator, and formed of a flexible material; and
   a third optical fiber cable configured to connect the spectrometer and the optical fiber-circulator, and formed of a flexible material;
   wherein the probe includes:
   an inner space through which the light transferred from the second optical fiber cable passes;
   a collimator configured to collimate the light incident to the inner space;
   a diffraction grating configured to diffract the light having passed through the collimator;
   a galvanometer scanner configured to reflect the light having passed through the diffraction grating;
   an objective lens configured to concentrate the reflected light on a focal point; and
   an interferer configured to acquire an interfered light by reflecting at least a portion of the light having passed through the objective lens.

2. The common-path optical fiber-based handheld parallel OCT apparatus of claim 1, wherein the probe further includes:
   a relay lens disposed between the diffraction grating and the galvanometer scanner and configured to relay an image of the light having passed through the diffraction grating.

3. The common-path optical fiber-based handheld parallel OCT apparatus of claim 1, wherein when a direction facing the measurement target is forward, the interferer includes:
   a first glass disposed forward the objective lens;
   a second glass disposed forward the first glass; and
   a cover glass disposed forward the second glass.

4. The common-path optical fiber-based handheld parallel OCT apparatus of claim 3, wherein a front face of the second glass includes a beam splitter layer, and
   the light reflected from the measurement target is interfered with a light reflected from the beam splitter layer, sequentially passes through the second optical fiber cable, the optical fiber circulator, and the third optical fiber cable, and is input to the spectrometer.

5. The common-path optical fiber-based handheld parallel OCT apparatus of claim 4, wherein a front face and a rear face of the cover glass, and a rear face of the first glass, and a rear face of the second glass include an anti-reflective coated layer, and
   the front face of the first glass does not include a coated layer.

6. The common-path optical fiber-based handheld parallel OCT apparatus of claim 5, wherein the first glass, the second glass, and the cover glass include an optical crown glass or an optical polymer.

7. The common-path optical fiber-based handheld parallel OCT apparatus of claim 4, wherein the focal point of the objective lens is formed forward the cover glass, and
   a distance between the beam splitter layer and the focal point of the objective lens is the same as a distance between the beam splitter layer and the front face of the first glass.

8. The common-path optical fiber-based handheld parallel OCT apparatus of claim 1, wherein the probe has a curved shape based on the galvanometer scanner.

* * * * *